(12) United States Patent
Suzuoka et al.

(10) Patent No.: US 6,385,605 B1
(45) Date of Patent: May 7, 2002

(54) INFORMATION RETRIEVAL APPARATUS AND A METHOD

(75) Inventors: Takashi Suzuoka, Kanagawa-ken; Nobuyuki Sawashima, Tokyo, both of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/156,869

(22) Filed: Sep. 18, 1998

(30) Foreign Application Priority Data

Sep. 26, 1997 (JP) .............................. 9-261176

(51) Int. Cl.$^7$ .............................. G06F 17/30
(52) U.S. Cl. .............................. 707/4; 707/5
(58) Field of Search .............................. 707/10, 9, 5, 3, 707/4; 395/706

(56) References Cited

U.S. PATENT DOCUMENTS

| | | | | |
|---|---|---|---|---|
| 5,640,553 A | * | 6/1997 | Schultz | 707/5 |
| 5,717,914 A | * | 2/1998 | Husick et al. | 707/5 |
| 5,737,734 A | * | 4/1998 | Schultz | 707/5 |
| 5,802,518 A | * | 9/1998 | Karaev et al. | 707/9 |
| 5,860,009 A | * | 1/1999 | Uchihira et al. | 395/706 |
| 5,926,807 A | * | 7/1999 | Peltonen et al. | 707/3 |
| 5,933,832 A | * | 8/1999 | Suzuoka et al. | 707/10 |
| 6,055,535 A | * | 4/2000 | Suzuoka et al. | 707/10 |
| 6,067,539 A | * | 5/2000 | Cohen | 707/2 |
| 6,154,737 A | * | 11/2000 | Inaba et al. | 707/3 |

FOREIGN PATENT DOCUMENTS

JP 4-326163 11/1992

OTHER PUBLICATIONS

Suzuoka et al., "Performance Debugging Based on Scalability Analysis," Frontiers of Massively Parallel Computation, 1995, Proceedings, pp. 406–413, Feb. 6, 1995.*

* cited by examiner

Primary Examiner—Thomas Black
Assistant Examiner—Charles L. Rones
(74) Attorney, Agent, or Firm—Oblon, Spivak, McClelland, Maier & Neustadt, P.C.

(57) ABSTRACT

An information retrieval apparatus retrieves information from a database. When a retrieval request is received from a user, a first retrieval section retrieves information from the database using a retrieval expression in the retrieval request. A retrieval result memory section stores the information retrieved by the first retrieval section. If a new retrieval request is not received and detailed information corresponding to the retrieval expression is not stored in the retrieval result memory section, a second retrieval section retrieves more appropriate information from the database using a modified retrieval expression and/or more sophisticated retrieval algorithm.

26 Claims, 10 Drawing Sheets

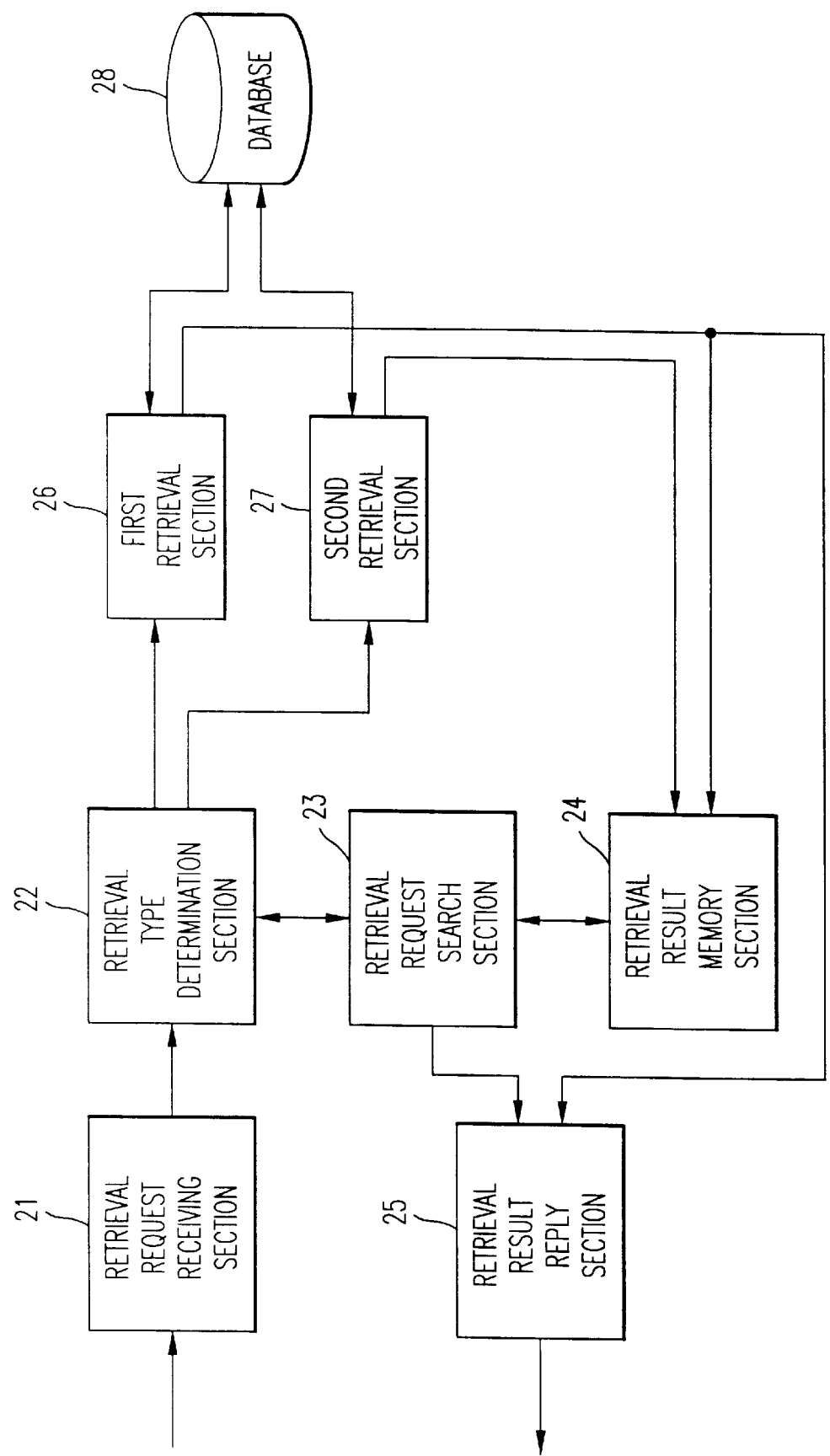

FIG. 3a

| RETRIEVAL EXPRESSION | FIRST RETRIEVAL | SECOND RETRIEVAL | RETRIEVAL RESULT |
|---|---|---|---|
| AA AND BB | DONE | DONE | ... ... ... ... |
| CC AND DD | DONE | DONE | ... ... ... ... |
| (BB AND CC) OR (EE AND FF) | DONE | | ... ... ... ... |
| AA AND BB AND CC | DONE | | ... ... ... ... |
| CC AND DD AND EE | DONE | | ... ... ... ... |
| : | : | : | : |

FIG. 3b

| RETRIEVAL EXPRESSION | FIRST RETRIEVAL | SECOND RETRIEVAL | NUMBER OF RETRIEVAL REQUEST | RETRIEVAL RESULT |
|---|---|---|---|---|
| AA AND BB | DONE | DONE | 411 | ... ... ... ... |
| CC AND DD | DONE | | 12 | ... ... ... ... |
| (BB AND CC) OR (EE AND FF) | DONE | | 48 | ... ... ... ... |
| AA AND BB AND CC | DONE | DONE | 143 | ... ... ... ... |
| CC AND DD AND EE | DONE | DONE | 54 | ... ... ... ... |
| : | : | : | : | : |

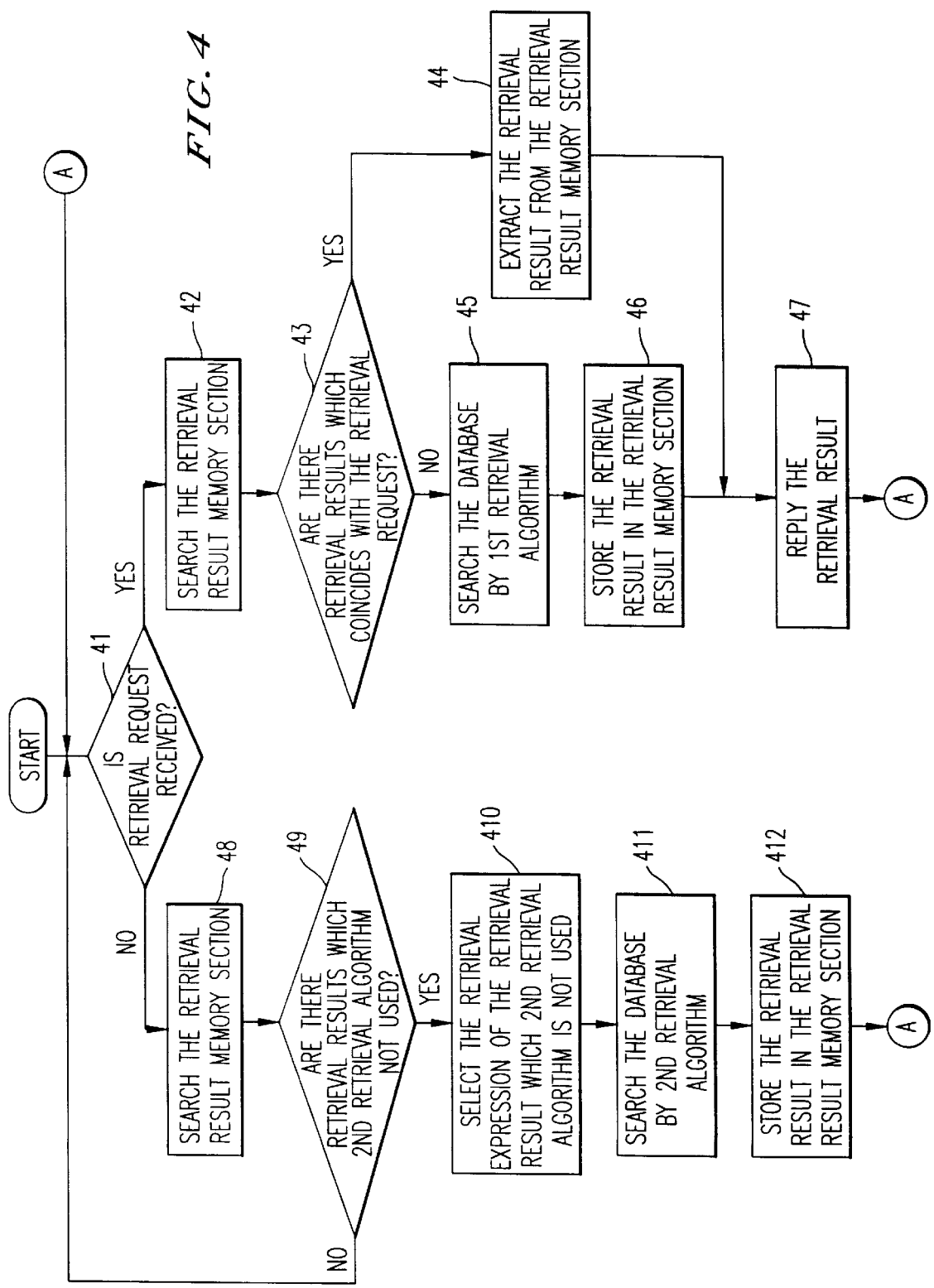

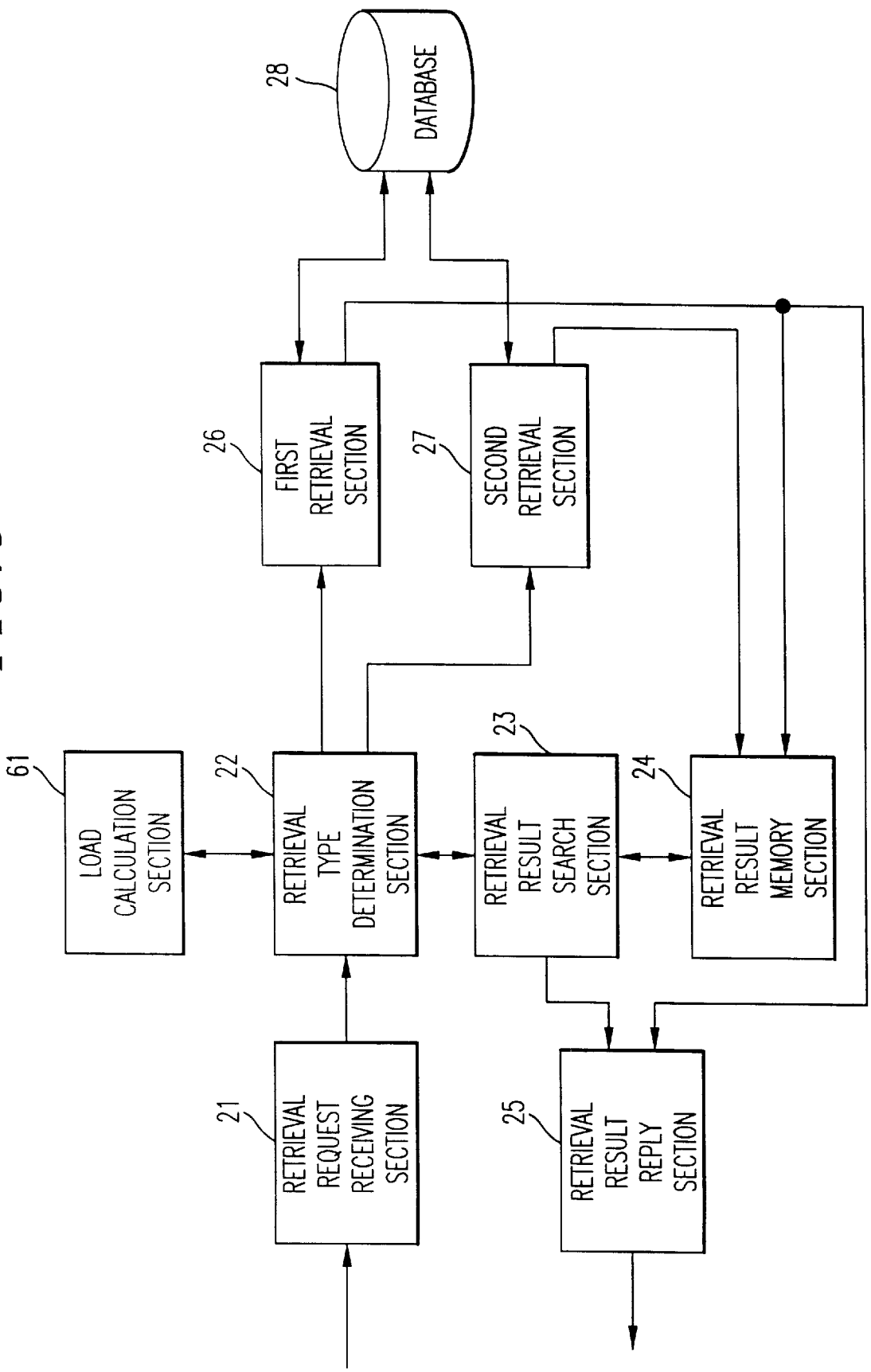

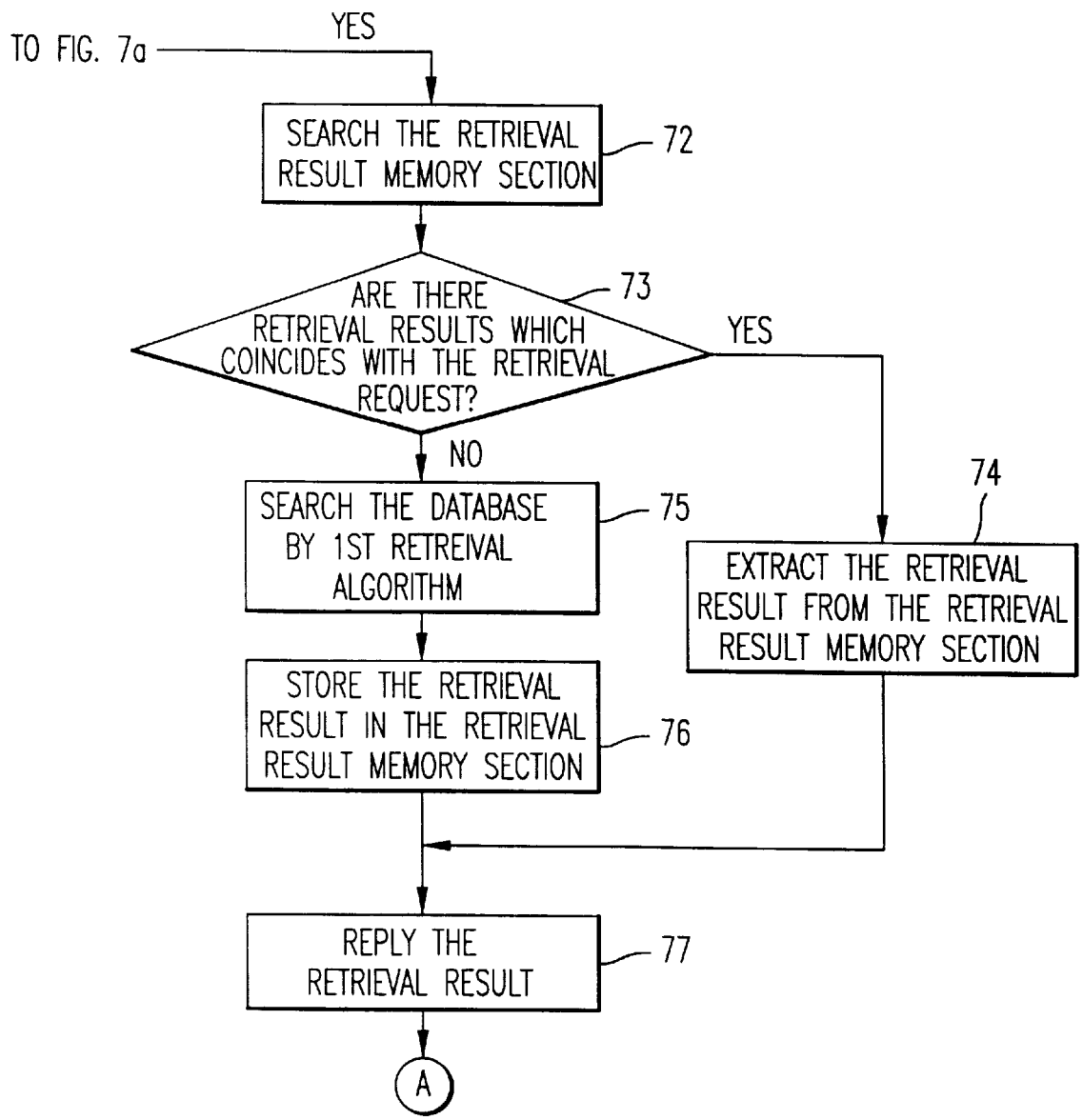

FIG. 9

| USER CODE | INTERESTED TOPIC |
|---|---|
| A | SOCCER |
| B | PERSONAL COMPUTER |
| C | ECONOMY |
| D | SOCCER |
| E | GOLF |
| F | SOCCER |
| G | SOCCER |

FIG. 10

| INTERESTED TOPIC | RETRIEVAL EXPRESSION | NUMBER OF RETRIEVAL REQUEST |
|---|---|---|
| SOCCER | WORLD CUP | 10 |
| SOCCER | JAPAN LEAGUE | 1 |
| PERSONAL COMPUTER | BROWSER | 1 |

INFORMATION RETRIEVAL APPARATUS AND A METHOD

FIELD OF THE INVENTION

The present invention relates to an information retrieval apparatus and a method to present high quality information to a user quickly in a network system.

BACKGROUND OF THE INVENTION

Recently, the World Wide Web ("WWW") is widely used. In the Internet or Intranet, electric information is easily accessible. Therefore, a so-called information flood occurs and the user can not easily extract his desired data from vast information. In order to reduce this problem, retrieval systems (i.e., search engines) appeared in the Internet or Intranet. As a retrieval system, "Altavista" of DEC and "excite" of Excite corporation are well known. When a retrieval request is received from the user as a retrieval expression, the retrieval system presents the information (Web pages) which best related with the retrieval expression. In this case, a web page as a retrieval object is preserved as a format of an index table and quickly retrieved. However, if a large number of retrieval requests are received at once from many users in the world, it takes a long time to process all of them.

Accordingly, in order to quickly respond to the user for at least one retrieval request, the system caches the previous retrieval result. In this technique, if the information is retrieved from the database by the retrieval expression, the information is stored in a storage device (cache memory) as the retrieval result. Hereafter, when the retrieval request is the same as before, at least one retrieval result is extracted from the storage device and quickly presented to the user. In short, after the second retrieval request, the database is not actually retrieved and the information is provided to the user by referring to the cache content. This technique is disclosed in Japanese Patent Disclosure (Kokai) H4-199468, H4-326163.

However, in this kind of the retrieval system, the quality of the retrieval result is not taken into consideration because a fast retrieval and a high quality of the retrieval result conflict with each other. In short, when an accurate retrieval algorithm improves the quality of the retrieval result, but it takes a long time. On the other hand, in case of the retrieval is executed by a profile (interest topic) by unit of the user, the retrieval results stored in the cache memory is not effective for other users. In the latter case, the response time to present the retrieval result to the user is long because the information is normally retrieved from the database.

Now, characteristics of WWW retrieval in their present condition will be analysed.

Firstly, a huge number of requests come randomly. A large number of the retrieval requests are received through a network, but it is necessary to quickly respond to these retrieval request. Each user respectively locates a terminal connected to the network. Therefore, each retrieval request reaches the retrieval system at random.

Secondly, same retrieval expressions are requested often. A large number of retrieval requests are not different each other. About seventy percent of the retrieval expressions are same. Especially, in the WWW, many users want to know new information. In general, the kind of the new information is limited and the retrieval requests often are the same retrieval expression.

Thirdly, the retrieval with a sophisticated algorithm takes a long time. The retrieval results will be better when the system retrieves the data with synonyms of words in retrieval expression, the integration of character base and word base retrieval, and with the user's profile, but the retrieval time will be long.

As mentioned-above, when using the elaborate retrieval algorithm, the retrieval processing takes a long time. However, if the retrieval results formerly obtained is provided, the retrieval results are poor to the user.

SUMMARY OF THE INVENTION

It is an object of the present invention to provide an information retrieval apparatus and a method to present at least one retrieval result of high quality to the user quickly.

According to the present invention, there is provided an information retrieval apparatus, comprising: a receiving means for receiving a retrieval request from a user; a first retrieval means for retrieving information from a database in response to the retrieval request; a retrieval result memory means for storing the information retrieved by said first retrieval means; and a second retrieval means for retrieving detailed or additional information from the database by using the retrieval request in case a new retrieval request is not received by said receiving means.

Further in accordance with the present invention, there is also provided a method for retrieving information from a database; comprising the steps of: receiving a retrieval request from a user; retrieving the information from the database in response to the retrieval request; storing the information retrieved at the retrieving step in a retrieval result memory; and advanced retrieving information from the database by using the retrieval request in case new retrieval request is not received at the receiving step.

Further in accordance with the present invention, there is also provided a computer readable memory containing computer readable instructions to retrieve information from a database, comprising: an instruction means for causing a computer to receive a retrieval request from a user; an instruction means for causing a computer to retrieve the information from the database in response to the retrieval request; an instruction means for causing a computer to store the retrieved information in a retrieval result memory; and an instruction means for causing a computer to retrieve detail information from the database by using the retrieval request in case new retrieval request is not received.

BRIEF DESCRIPTION OF THE DRAWINGS

FIG. 2 is a block diagram of the information retrieval apparatus according to the first embodiment of the present invention.

FIGS. 3A and 3B show data stored in a retrieval result memory section in the information retrieval apparatus in FIG. 2.

FIG. 4 is a flow chart of the processing of the information retrieval method according to the first embodiment of the present invention.

FIG. 6 is a block diagram of the information retrieval apparatus according to a second embodiment of the present invention.

FIG. 9 shows interested topic data stored in a profile information memory section in the information retrieval apparatus in FIG. 8.

FIG. 10 shows number of retrieval request for each retrieval expression stored in the profile information memory section in the information retrieval apparatus in FIG. 8.

DETAILED DESCRIPTION OF THE PREFERRED EMBODIMENTS

Figure 1:
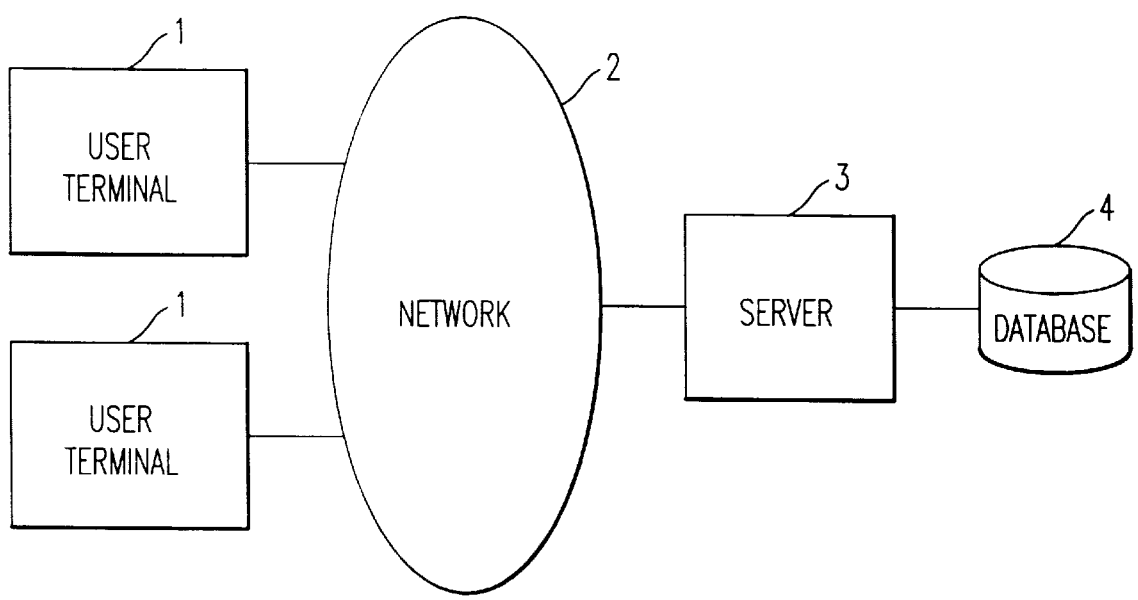
FIG. 1 is a block diagram of a retrieval system incorporating an information retrieval apparatus of the present invention.

Embodiments of the present invention will be explained referring to the Figures. FIG. 1 is a block diagram of system incorporating the information retrieval method of the present invention. In FIG. 1, the user inputs the retrieval request from a user terminal 1 to a server 3, which is realized as the information retrieval apparatus of the present invention, through a network 2. The server 3 obtains the retrieval result which coincides with the retrieval request by referring to a large number of data (for example, a table information of Web page) stored in a database 4, and transmits at least one retrieval result to the user terminal 1. In general, as the data stored in the database 4, the Web page is converted to a format of an index table. However, the conversion is not limited to this format. In short, the retrieval object data may be stored by some format.

FIG. 2 is a block diagram of the information retrieval apparatus according to the first embodiment of the present invention. In FIG. 2, when a retrieval request receiving section 21 receives the retrieval request including a predetermined retrieval expression through the network 2, the retrieval request receiving section 21 sends the retrieval request to a retrieval kind determination section 22. The retrieval kind determination section 22 executes later-mentioned processing in case the retrieval request is not received from the retrieval request receiving section 21. In case the retrieval request is received, the retrieval kind determination section 22 extracts the retrieval expression from the retrieval request and inquires of a request result search section 23 whether a retrieval by same retrieval expression has been executed in the past. The retrieval result search section 23 examines whether the retrieval result obtained by the same retrieval expression is already stored in a retrieval result memory section 24.

FIGS. 3A and 3B show examples of data stored in the retrieval result memory section 24. As shown in FIG. 3A, by referring to a field 31 of the retrieval expression, the retrieval result search section 23 examines whether the same retrieval expression is already stored. If the same retrieved expression is stored in the field 31, the retrieval result corresponding to the same retrieval expression is extracted from a field 34 of the retrieval result and outputted to a retrieval result reply section 25. On the other hand, if the same retrieval expression is not stored in the field 31, an instruction is sent to the retrieval kind determination section 22 to execute the later-mentioned processing. The retrieval result reply section 25 transmits at least one retrieval result received from the retrieval result search section 23 to the user terminal 1 through the network.

In case the retrieval type determination section 22 receives the instruction of non-storing of the retrieval expression from the retrieval result search section 23, the retrieval type determination section 22 requests a retrieval based on the retrieval expression to a first retrieval section 26. The first retrieval section 26 retrieves the information from the database 28 by a fast retrieval algorithm, for example, an algorithm of low retrieval accuracy. The first retrieval section 26 writes the retrieval result in the retrieval result memory section 24 and sends the retrieval result to the retrieval result reply section 25. In this case, when the retrieval result is written in the retrieval result memory section 24, a flag is written in a check field 32 of the first retrieval as shown in FIG. 3A. As an internal expression of the system, for example, the flag "1" is written as the retrieval completion. In FIG. 3A, the flag "done" is shown as the retrieval completion. In the first embodiment, the first retrieval obtained by using the retrieval expression represents the retrieval based on the first retrieval algorithm (method). In case some data exists in the field 31 of the retrieval expression, the flag is also written in the check field 32 of the first retrieval corresponding to the field 31. Therefore, the check field 32 may be omitted by referring to the retrieval expression field 31 and the retrieval result field 34.

In case the retrieval type determination section 22 does not receive the retrieval request from the retrieval request receiving section 21, the retrieval type determination section 22 inquires of the retrieval result search section 23 whether the retrieval expression, whose retrieval result is obtained by the first retrieval algorithm and not obtained by the second retrieval algorithm, is stored in the retrieval result memory section 24. In response to the inquiry, the retrieval result search section 23 extracts the retrieval expression by referring to the retrieval result memory section 24 and transmits the retrieval expression to the retrieval type determination section 22. In this case, as shown in FIG. 3A, the retrieval expression, of which the check field 32 of the first algorithm is written by "done" and the check field 33 of the second algorithm is not written, is extracted. If a plurality of the retrieval expressions are extracted, one retrieval expression is selected by a predetermined standard. As the predetermined standard, for example, the latest retrieval expression is selected. Otherwise, as shown in FIG. 3B, the number of retrieval requests by the retrieval expression are counted in a field 35 and the retrieval expression whose number of retrieval requests is largest is selected. In FIG. 3B, the retrieval expression "(BB and CC) or (EE and FF)" is selected because the number of retrieval requests "48" is the largest value in the retrieval expressions not having the second retrieval flag "done".

When the retrieval type determination section 22 receives the retrieval expression from the retrieval result search section 23, the retrieval type determination section 22 requests a second retrieval section 27 to retrieve a further information by using the retrieval expression. The second retrieval section 27 retrieves the detail information from a database 28 by the second retrieval algorithm whose retrieval accuracy is higher than the first retrieval algorithm, and writes the detail information in the retrieval result memory section 24. In this case, as shown in FIG. 3A, a flag "done" is written in the check field 33.

FIG. 4 is a flow chart of the processing of the information retrieval method according to the first embodiment. First, the retrieval type determination section 22 decides whether the retrieval request is received (step 41). When receiving the retrieval request, the retrieval type determination section 22 sends the instruction of receiving to the retrieval result search section 23. The retrieval result search section 23 retrieves the retrieval result memory section 24 (step 42), and decides whether the retrieval result corresponding to the retrieval expression in the retrieval request is stored in the retrieval result memory section 24. (step 43). When the retrieval result is already stored, the retrieval result search section 23 extracts the retrieval result from the retrieval result memory section 24 (step 44) and sends it to the retrieval result reply section 25. Otherwise, the retrieval result search section 23 sends the instruction to the retrieval type determination section 22. The retrieval type determination section 22 requests the first retrieval section 26 to retrieve by the first algorithm. The first retrieval section 26 retrieves the database 28 by the first algorithm (step 45), writes the retrieval result in the retrieval result memory section 24, and sends it to the retrieval result reply section 25 (step 46). When the retrieval result reply section 25 receives the retrieval result from the retrieval result search section 23 or the first retrieval section 26, the retrieval result is sent to the user (step 47).

On the other hand, when the retrieval type determination section 22 does not receive the retrieval request, the instruction of non-receiving is sent to the retrieval result search section 23. The retrieval result search section 23 searches the retrieval expression, whose retrieval result is obtained by the first algorithm but not obtained by the second algorithm from the retrieval result memory section 24 (step 48). If the retrieval expression is searched (step 49), one retrieval expression is selected by the predetermined standard (step 410) and outputted to the retrieval type determination section 22. The retrieval type determination section 22 requests the second retrieval section 27 to retrieve by the second algorithm. The second retrieval section 27 retrieves more appropriate information from the database by the second algorithm (step 411), and writes the retrieval result to the retrieval result memory section 24. The flag "done" is written in the check field 33 in the retrieval result memory section 24.

For example, the first retrieval algorithm retrieves information for the past one year from the database, and the second retrieval algorithm retrieves information for the past ten years. As another example, the first retrieval algorithm retrieves using a keyword (retrieval expression) only and the second retrieval algorithm retrieves by using not only the keyword but also a synonym or a same category word.

As mentioned-above, if the retrieval request is received and a system load becomes high, the first retrieval algorithm whose accuracy is low is quickly executed. In this case, the response time to the user is short. On the other hand, while another retrieval request is not received, the second retrieval algorithm whose accuracy is high is executed. In this case, the detailed information for the retrieval request received in the near future is previously stored. As a result, in response to the retrieval request in the future, the retrieval result of high quality is quickly presented to the user.

Figure 5:
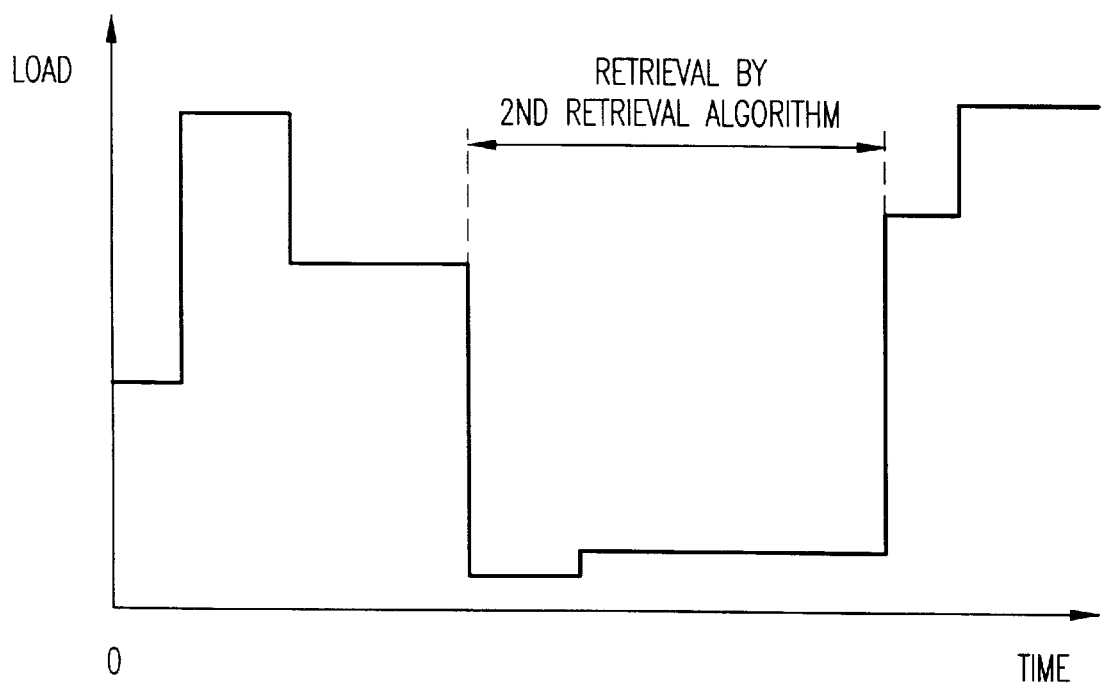
FIG. 5 is a schematic diagram of a time chart of a second retrieval algorithm according to a second embodiment of the present invention.

In the first embodiment, while the retrieval request is not received, the second retrieval algorithm is executed. However, in the second embodiment, by monitoring the load of the system in addition to non-receiving of the retrieval request, the second retrieval algorithm is decided to be executed. FIG. 5 is a time chart showing a change status of the system load. As shown in FIG. 5, while the system load is low, the second retrieval algorithm is executed.

FIG. 6 is a block diagram of the information retrieval apparatus according to the second embodiment. In comparison with the first embodiment in FIG. 2, a load calculation section 61 differs in the block diagram. In case the retrieval request is not received, the retrieval type determination section 22 asks the load calculation section 61 for the load status of the system. The load calculation section 61 calculates the load value of the system at the present time, and sends the load value to the retrieval type determination section 22. The load value is calculated by using a system call of the operating system or a load average of the CPU. The load value may be the average value at predetermined interval. When the retrieval type determination section 22 receives the load value, the retrieval type determination section 22 decides whether the load value is below a predetermined threshold. If the load value is below the predetermined threshold (the system load is small), the retrieval type determination section 22 asks the retrieval result search section 23 to search the retrieval expression whose retrieval result is obtained by the first algorithm but not obtained by the second algorithm from the retrieval result memory section 24. Hereafter, processing is same as the first embodiment. Therefore, explanation is omitted.

Figure 7A:
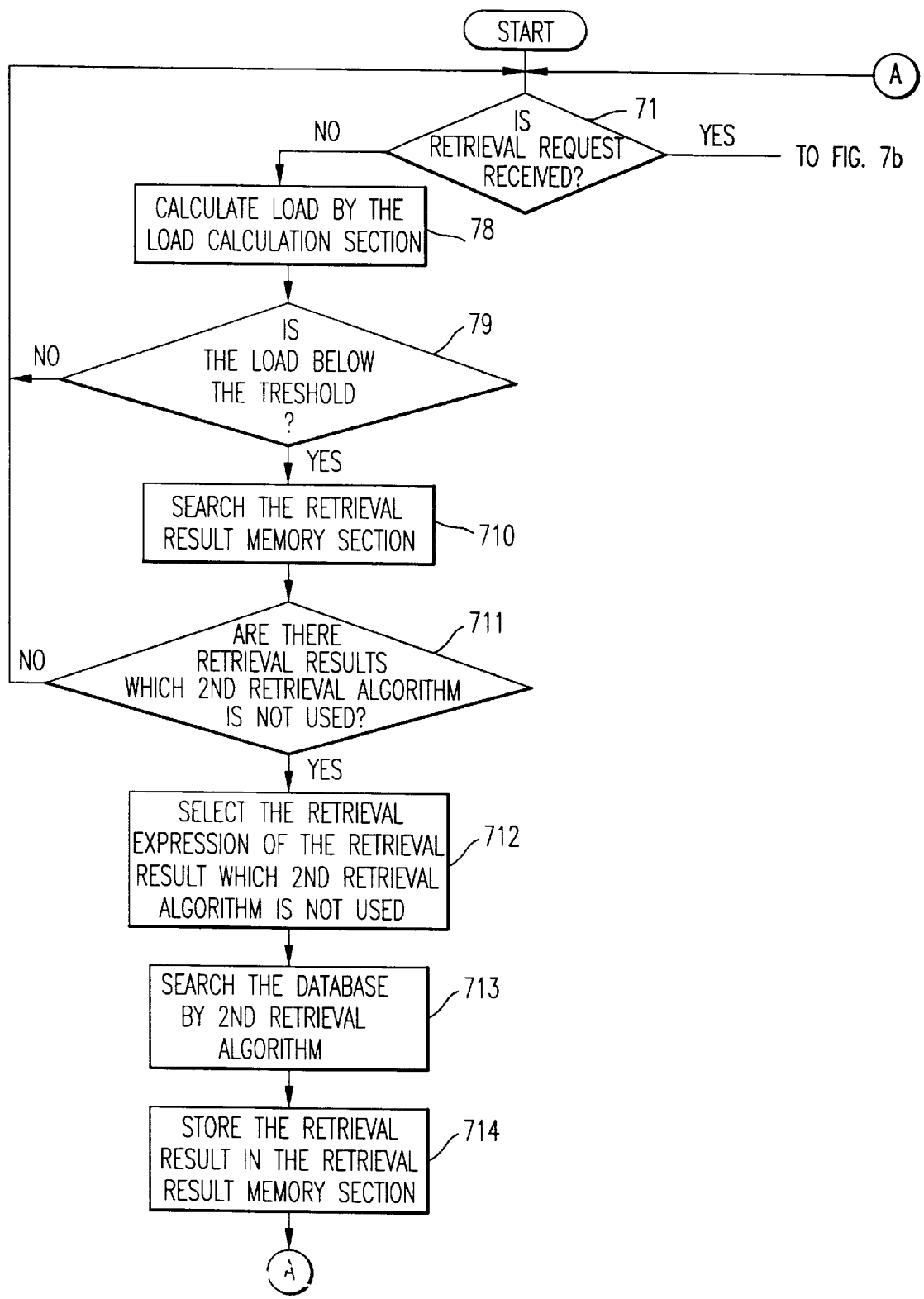
FIG. 7 is a flow chart of the processing of the information retrieval method according to the second embodiment of the present invention.

FIG. 7 is a flow chart of processing of the information retrieval method according to the second embodiment. In comparison with the flow chart of the first embodiment in FIG. 4, steps 78 and 79 are different steps in the flow chart. In FIG. 7, in case the retrieval request is not received (step 71), the retrieval type determination section 22 asks the load calculation section 61 for the load value. The load calculation section 61 calculates the load value (step 78). The retrieval type determination section 22 compares the load value with the predetermined threshold. If the load value is below the predetermined threshold (step 79), processing from step 710 is continuously executed.

As mentioned-above, in the second embodiment, the actual load of the system is monitored while the retrieval request is not received. Accordingly, if the load of the system is high for some reason, the processing to highly raise the load (second retrieval algorithm) is avoided. As a result, the system is effectively used. In case the predetermined server 3 in FIG. 1 is utilized as not only the retrieval system but also as various kinds of processing systems, the second embodiment is especially useful.

In the first and second embodiments, while another retrieval request is not received and so on, the second retrieval algorithm is executed for the retrieval expression whose retrieval result is not obtained by the first retrieval algorithm. However, in the third embodiment, the retrieval algorithm is executed according to a user's attribute profile in addition to the retrieval expression. For example, assume that the first retrieval algorithm and the second retrieval algorithm are already executed using a keyword "personal computer" in the retrieval request. In this case, if many users are interested in "Economy", the detail information is previously retrieved by both the keyword "Personal Computer" and the keyword "Economy".

Figure 8:
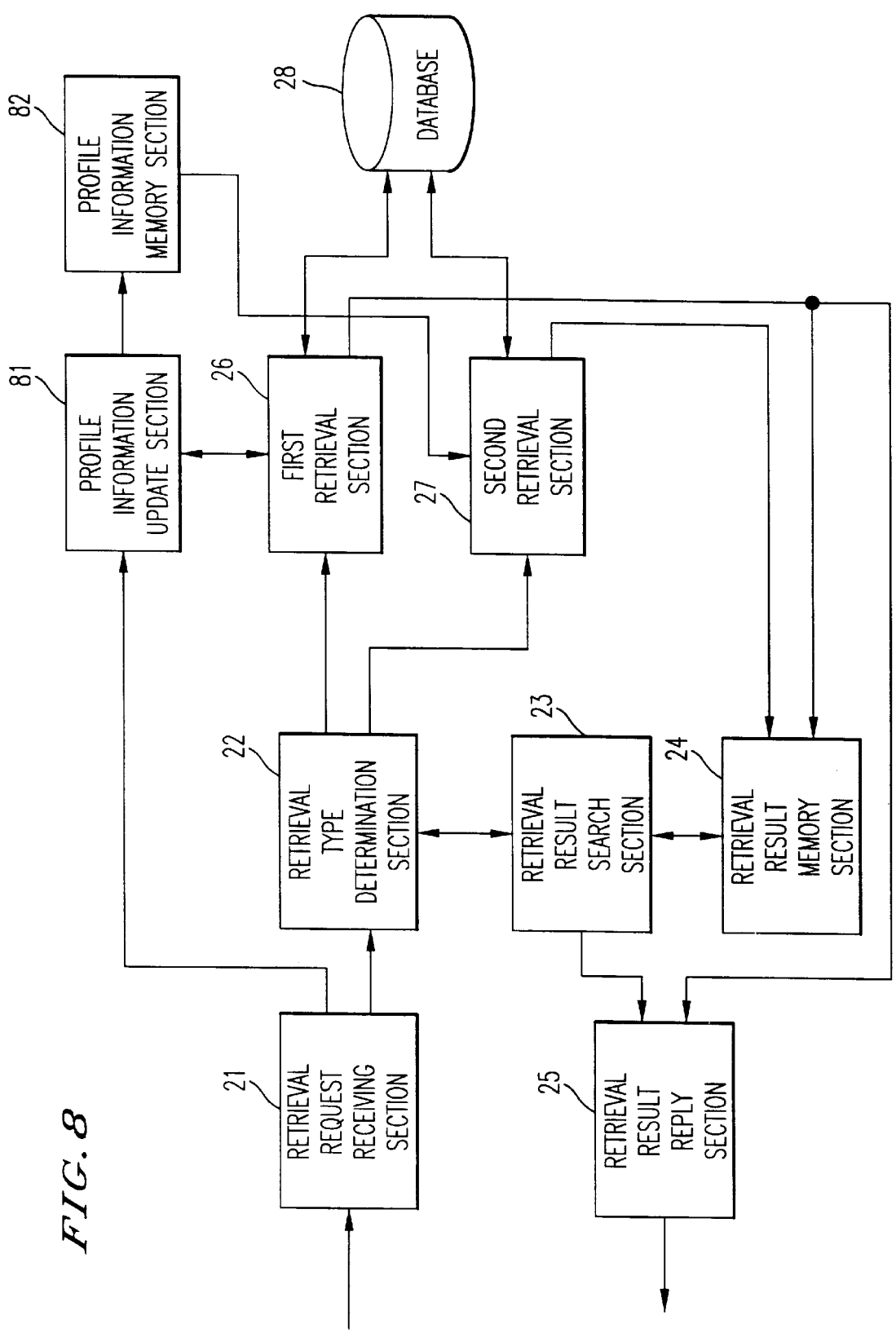
FIG. 8 is a block diagram of the information retrieval apparatus according to a third embodiment of the present invention.

FIG. 8 is a block diagram of the information retrieval apparatus according to the third embodiment. In comparison with the first embodiment, a profile information update section 81 and a profile information memory section 82 differ in the block diagram. First, when the retrieval request including the retrieval expression S is received from a user A, the retrieval request receiving section 21 sends the instruction to the profile information update section 81. If an area of the user A is not secured in the profile information memory section 82, the profile information update section 81 secures an area for the user A in the profile information memory section 82. The first retrieval section 26 or the second retrieval section 27 extracts the predetermined element (for example, a keyword) from the retrieval expression S, and sends the keyword to the profile information update section 81. The profile information update section 81 writes the keyword in the area of the user A of the profile information memory section 82. In this case, the profile information memory section 82 may store the number of appearance frequency by unit of the keyword. In short, the retrieval corresponding to a different retrieval request by unit of the user may be executed.

Next, assume that the first retrieval section 26 retrieves data from the database, stores n-units of high rank of the first retrieval results in the retrieval result memory section 24, and sends m-units (m<n) of high rank from the n-units retrieval results to the user A. Then, if the second retrieval section 27 executes the second retrieval algorithm by using the retrieval expression S in the same way as the first embodiment, n-units of high rank of the second retrieval results are also stored in the retrieval result memory section 24. However, in this case, the n-units of high rank of the first retrieval results are not deleted in the retrieval result memory section 24. The n-units of high rank of the first retrieval results are irrelevant to the second retrieval results from (m+1)th-unit of high rank when the user A wants to watch the first retrieval results from (m+1)th-unit of high rank. In order to avoid this situation, in the case of the "WWW", the user is identified by using a "cookie" or "fat URL". As for the user A, the first retrieval results from (m+1)th-unit of high rank is presented. In this case, the storing time of the first retrieval results in the retrieval result memory section 24 is previously determined. When the storing time passed, the first retrieval results are deleted in the retrieval result memory section 24. Accordingly, if another user inputs the retrieval request including the retrieval expression S, the second retrieval results will be presented to the other user.

Next, a modification of the third embodiment is explained. FIG. 9 shows a table of interested topic for each user stored in the profile information memory section 82. First, each user previously registers his interested topic to the profile information memory section 82 through the user terminal 1. Hereafter, whenever each user inputs the retrieval request including the retrieval expression, the profile information update section 81 counts the number of the retrieval request by unit of the retrieval expression for each interest topic. FIG. 10 shows a table of the counted number of retrieval requests by unit of the retrieval expression for each interest topic stored in the profile information memory section 82. In this way, when the retrieval request is not received, the second retrieval section 27 retrieves the detail information by using the retrieval expression with the largest number of retrieval requests. In FIG. 10, by using the keywords "SOCCER" and "WORLD CUP", the second retrieval algorithm is executed. Accordingly, the detail information in which many users are interested at the present time is previously stored, and quickly presented to the user when he inputs the retrieval request including this retrieval expression.

In case a quantity of information (for example, the document) as retrieval objects increases, the content of the database 28 is updated in proportion to the increased quantity of the information. In this case, the updated database 28 often affects the retrieval results stored in the retrieval result memory section 24. For example, in case the retrieval results by a keyword "Personal Computer" is already stored in the retrieval result memory section 24 and a new document including the word "Personal Computer" is added to the database 28, the retrieval results by the keyword "Personal Computer" must be deleted in the retrieval result memory section 24. Therefore, in the fourth embodiment, if the new document is added to the database, the word included in the new document is determined to coincide with the retrieval expression in the retrieval result memory section 24. If the word coincides with the retrieval expression, the retrieval results are deleted in the retrieval result memory section 24. Furthermore, if the document is deleted from the database, the retrieval results including at least one part of the document, is determined to be stored in the retrieval result memory section 24. If the retrieval results, including at least one part of the document, are already stored, the retrieval results are deleted in the retrieval result memory section 24. As for the deleted retrieval results, it is possible for the user to retrieve again. Therefore, while the load of the retrieval engine is low, retrieval for the updated database is executed again by using same retrieval expression. In this case, if the retrieval results corresponding to a plurality of the retrieval expressions are deleted, the retrieval expression is selected in priority order to retrieve the updated database. For example, the retrieval expression of the largest number of retrieval requests, or the retrieval expression of the most recent use is selected.

In the first, second, and third embodiments, the first retrieval algorithm and the second retrieval algorithm are used. However, a plurality of different kinds of retrieval algorithms, i.e., more than two, may be used. For example, after the second retrieval algorithm is executed, the third retrieval algorithm whose accuracy is higher than the second retrieval algorithm may be executed during idle time of the computer. By repeating this processing, arbitrary steps of the retrieval algorithm whose accuracy is higher in order are used.

Furthermore, as an example in the above-mentioned embodiment, the retrieval is executed for text data in the database. However, the retrieval may be executed for multimedia data in the database. For example, as for an image retrieval algorithm of low accuracy, a matching as a histogram level is executed by using a reduced image or a low resolution image. As for an image retrieval algorithm of high accuracy, a matching of high level is executed by using a high resolution image.

A memory can be used to store instructions for performing the process of the present invention described above. Such a memory can be a hard disk, optical disk, semiconductor memory, and so on.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An information retrieval apparatus, comprising:
   a receiving unit configured to receive from a user, retrieval requests including a first retrieval request;
   a first retrieval unit configured to retrieve first information from a database in response to the first retrieval request, in accordance with a first retrieval algorithm that has a first retrieval accuracy;
   a retrieval result memory configured to store the first retrieval request and the first information;
   a retrieval result reply unit configured to send the first information to the user; and
   a second retrieval unit configured to use the stored first retrieval request to retrieve from the database, while a load of the apparatus is below a threshold, high quality information that has a higher quality than the first information, in accordance with a second retrieval algorithm that has a second retrieval accuracy that is higher than the first retrieval accuracy;

wherein said retrieval result memory stores the high quality information retrieved by said second retrieval unit; and wherein, if said receiving unit receives a second retrieval request that is identical to or similar to the stored first retrieval request, said retrieval result reply unit sends the high quality information stored in said retrieval result memory to a user of the second retrieval request.

2. The information retrieval apparatus of claim 1, wherein:

said second retrieval unit retrieves the high quality information from the database while said first retrieval unit does not process the first information in response to the first retrieval request.

3. The information retrieval apparatus of claim 1, further comprising:

a load calculation unit that calculates the load of the apparatus.

4. The information retrieval apparatus of claim 1, further comprising:

a profile information memory configured to previously store an interested topic for each user code, and to count a number of retrieval requests for each retrieval expression in each interested topic.

5. The information retrieval apparatus of claim 4, wherein:

said second retrieval unit retrieves the high quality information from the database by both the interested topic and the retrieval expression having the highest number of retrieval requests.

6. The information retrieval apparatus of claim 1, wherein:

said first retrieval unit retrieves the first information by at least one retrieval expression in the first retrieval request, and said second retrieval unit retrieves the high quality information by a modified retrieval expression of the at least one retrieval expression.

7. The information retrieval apparatus of claim 6, wherein:

said retrieval result memory stores the high quality information retrieved by said second retrieval unit, for each retrieval expression.

8. The information retrieval apparatus of claim 7, wherein:

said second retrieval unit retrieves the high quality information from the database by the modified retrieval expression if the high quality information corresponding to the retrieval expression is not stored in said retrieval result memory.

9. The information retrieval apparatus of claim 8, wherein:

said retrieval result reply unit sends the high quality information to the user in response to a retrieval request if the high quality information corresponding to the retrieval expression in the retrieval request is stored in said retrieval result memory.

10. The information retrieval apparatus of claim 7, wherein said retrieval result memory additionally stores a number of retrieval requests with the information for each retrieval expression.

11. The information retrieval apparatus of claim 10, wherein said second retrieval unit retrieves the high quality information from the database by the modified retrieval expression of one retrieval expression having the highest number of retrieval requests in a plurality of retrieval expressions if high quality information corresponding to the plurality of retrieval expressions is not stored in said retrieval result memory.

12. A method for retrieving information from a database, comprising:

receiving a first retrieval request from a user;

first-retrieving first information from the database in response to the first retrieval request, according to a first retrieval algorithm that has a first retrieval accuracy;

storing in a retrieval result memory, the first information and the first retrieval request;

sending the first information to the user;

while a system load is below a threshold, using the stored first retrieval request in a step of second-retrieving from the database, high quality information that has a higher quality than the first information, in accordance with a second retrieval algorithm that has a second retrieval accuracy that is higher than the first retrieval accuracy;

storing in the retrieval result memory, the high quality information retrieved in the second-retrieving step; and if a second retrieval request is received that is identical to or similar to the stored first retrieval request, sending the high quality information to a user of the second retrieval request.

13. The method for retrieving information of claim 12, wherein:

the first information is retrieved at the first-retrieving step by a retrieval expression in the first retrieval request; and the high quality information is retrieved at the second-retrieving step by a modified retrieval expression of the retrieval expression.

14. The method for retrieving information of claim 12, wherein:

the first information is retrieved at the first-retrieving step by a retrieval expression in the first retrieval request; and wherein the high quality information is retrieved at the second-retrieving step with integrated algorithm of word-base search and character-base search.

15. The method for retrieving information of claim 12, wherein:

the first information is retrieved at the first-retrieving step by a retrieval expression in the first retrieval request; and the high quality information is retrieved at the second-retrieving step from the database including more information in terms of time from older to newer.

16. The method for retrieving information of claim 12, wherein:

the high quality information is retrieved at the second-retrieving step while the first information is not processed in response to the first retrieval request.

17. The method for retrieving information of claim 12, further comprising:

storing an interested topic for each user code; and counting a number of retrieval requests for each retrieval expression in each interested topic.

18. The method for retrieving information of claim 17, wherein:

the high quality information is retrieved at the second-retrieving step by both the interested topic and the retrieval expression having the highest number of retrieval requests.

19. The method for retrieving information of claim 12, further comprising:

calculating the system load.

20. The method for retrieving information of claim 13, wherein:

the high quality information is stored at the storing step in the retrieval result memory for each retrieval expression.

21. The method for retrieving information of claim 20, wherein:

the high quality information is retrieved at the second-retrieving step by the modified retrieval expression if the high quality information corresponding to the retrieval expression is not stored in the retrieval result memory.

22. The method for retrieving information of claim 21, wherein:

the high quality information is sent at the sending step to the user in response to the retrieval request if the high quality information corresponding to the retrieval expression in the retrieval request is stored in the retrieval result memory.

23. The method for retrieving information of claim 20, further comprising:

storing a number of retrieval requests with the information retrieved at the first-retrieving step for each retrieval expression.

24. The method for retrieving information of claim 23, wherein:

the high quality information is retrieved at the second-retrieving step by the modified retrieval expression of one retrieval expression having the highest number of retrieval requests in a plurality of retrieval expressions if high quality information corresponding to the plurality of retrieval expressions is not stored in the retrieval result memory.

25. A computer readable memory containing computer readable instructions to retrieve information from a database, the computer readable memory comprising:

instruction means for causing a computer to receive a first retrieval request from a user;

instruction means for causing the computer to retrieve first information from the database in response to the first retrieval request, in accordance with a first retrieval algorithm that has a first retrieval accuracy;

instruction means for causing the computer to store in a retrieval result memory, the first information and the first retrieval request;

instruction means for causing the computer to send the first information to the user;

instruction means for causing the computer to use the stored first retrieval request to retrieve from the database, while a system load is below a threshold, high quality information that has a higher quality than the first information, according to a second retrieval algorithm that has a second retrieval accuracy that is higher than the first retrieval accuracy;

instruction means for causing the computer to store in the retrieval result memory, the high quality information retrieved according to the second retrieval algorithm; and instruction means for causing the computer, if a second retrieval request is received that is identical to or similar to the stored first retrieval request, to send the high quality information to a user of the second retrieval request.

26. The computer readable memory of claim 25, further comprising:

instructions means for causing the computer to calculate the system load.

* * * * *